United States Patent [19]

Cissell et al.

[11] Patent Number: 5,060,539

[45] Date of Patent: Oct. 29, 1991

[54] PNEUMATIC STEPPER MOTOR ACTUATOR

[75] Inventors: Thomas J. Cissell; David C. Doerschuk, both of Columbus; Karsten G. Koester, Plain City; Gordon K. Reed, Bexley, all of Ohio

[73] Assignee: ABB Process Automation Inc., Columbus, Ohio

[21] Appl. No.: 642,773

[22] Filed: Jan. 18, 1991

[51] Int. Cl.⁵ ............................................. F16H 33/00
[52] U.S. Cl. ...................................... 74/640; 74/89.15; 92/2; 92/61; 92/92
[58] Field of Search ................... 74/89.15, 640; 92/2, 92/61, 68, 72, 92; 91/471

[56] References Cited

U.S. PATENT DOCUMENTS

| | | | |
|---|---|---|---|
| 3,088,333 | 5/1963 | Musser | 74/640 |
| 3,523,488 | 8/1970 | Robinson | 74/640 X |
| 4,425,822 | 1/1984 | Marschner et al. | 74/640 |
| 4,479,403 | 10/1984 | Marschner et al. | 74/640 |
| 4,719,816 | 1/1988 | Carlnas | 74/640 X |
| 4,833,941 | 5/1989 | Lepranen et al. | 74/640 X |

FOREIGN PATENT DOCUMENTS 2944124  5/1981  Fed. Rep. of Germany ........ 74/640

OTHER PUBLICATIONS

Engineering Design with DuPont Plastics.

Primary Examiner—Edward K. Look
Assistant Examiner—Todd Mattingly
Attorney, Agent, or Firm—Paul J. Lerner

[57] ABSTRACT

A pneumatic stepper motor weight actuator captures the advantages of polymeric harmonic gears while occupying less space and eliminating the problems associated with air entrapment in the stator grooves. Air entrapment is eliminated by providing orificed air passages from the bottom of the longitudinal stator grooves to the center stator hole. Advantageously, the actuator includes a rigid gear comprising a toothed polymeric sleeve adhesively bonded inside a metal cup.

7 Claims, 8 Drawing Sheets

SIXTEEN STEPS OF PRESSURIZATION

Fig. 3(a)

STEP 1

Fig. 3(b)

STEP 5

Fig. 3(c)

STEP 9

PNEUMATIC STEPPER MOTOR ACTUATOR

BACKGROUND AND SUMMARY OF THE INVENTION

The present invention pertains to actuators and, more particularly, to an actuator driven by a pneumatic stepper motor, especially one suited to drive a member such as a paper machine headbox slice opening control spindle.

Figure 1:
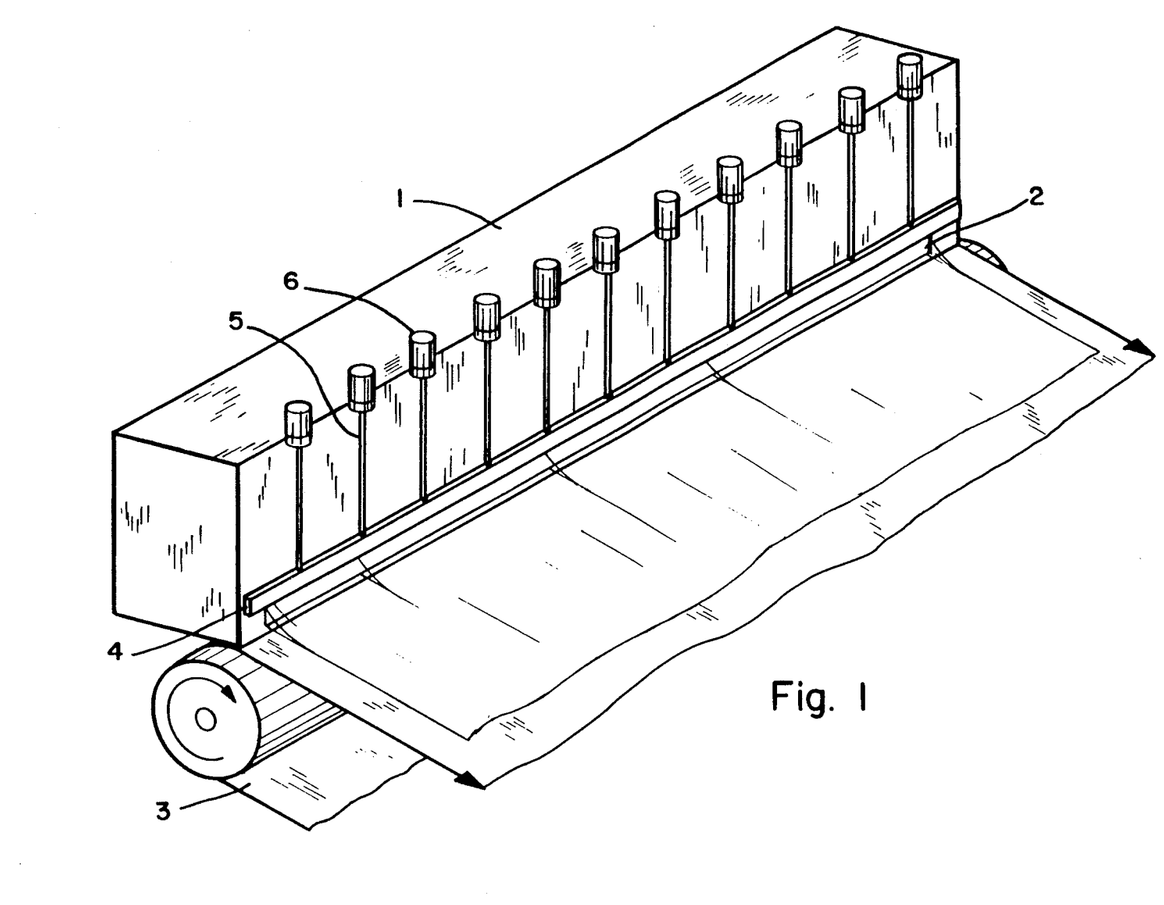
FIG. 1 is a perspective view of the headbox portion of a paper machine.

As illustrated in FIG. 1, a typical paper machine headbox 1 distributes pulp slurry or stock through a long horizontal slit opening 2 onto a traveling perforated web or "wire" 3. Transverse the direction of wire travel, paper density or "weight" can be changed by opening or closing a long stainless steel bar or "slice lip" 4 which comprises the top of the slit opening and, therefore, determines its height. Attached to the slice lip 4 are spindles or "slice rods" 5 which are typically spaced about 3 to 6 inches apart. By exerting a linear force through these spindles, "weight actuators" 6 can elastically deform the slice lip 4 into a shape which produces a slit opening that yields a paper sheet having a preselected weight that is uniform across the sheet.

Historically, the weight actuators driving the spindles were manually controlled. In recent years, however, automatic weight actuators have become available which operate in response to signals generated by weight, moisture and thickness sensors to precisely control distribution of pulp stock onto the wire.

To be effective, an automatic weight actuator must deliver a force ranging from 500 to about 4,000 pounds. At the same time, it must be very small so that it can fit into and onto a multitude of headbox styles which have many and varying nearby encumbrances.

Figure 2:
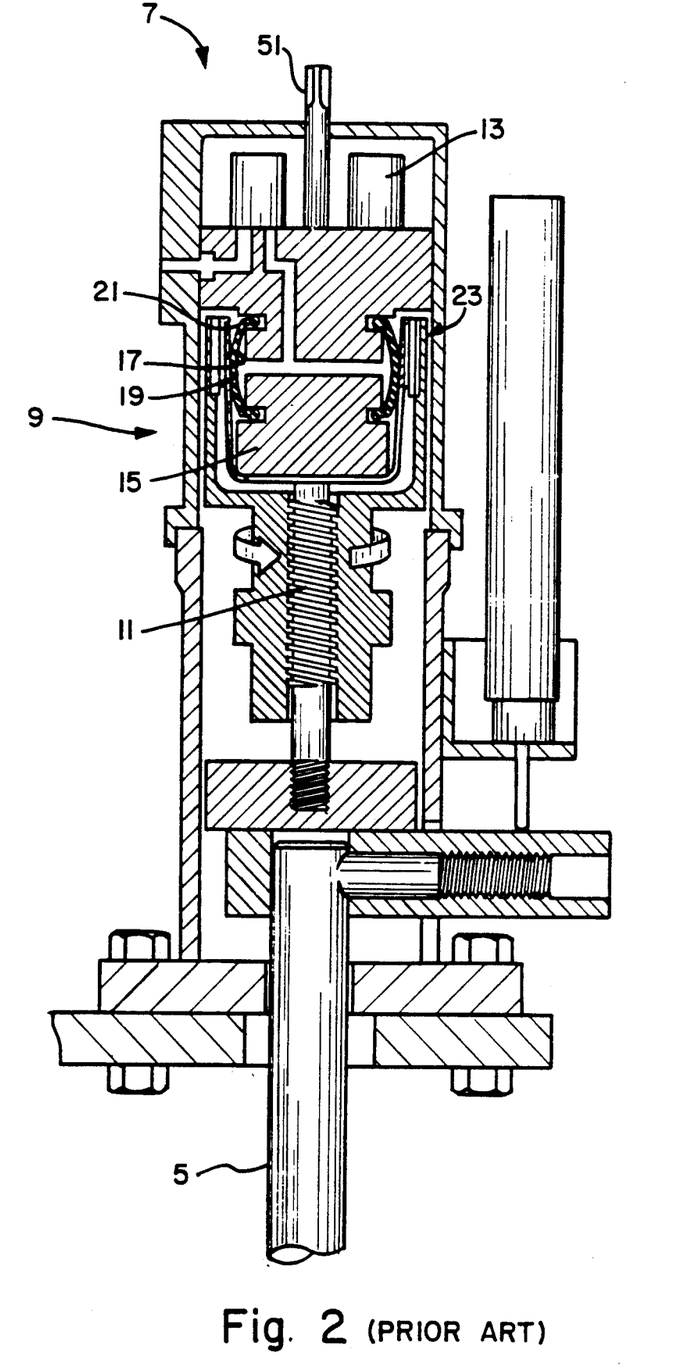
FIG. 2 is a cross-sectional view of a pneumatic stepper motor actuator.
Figure 3A:
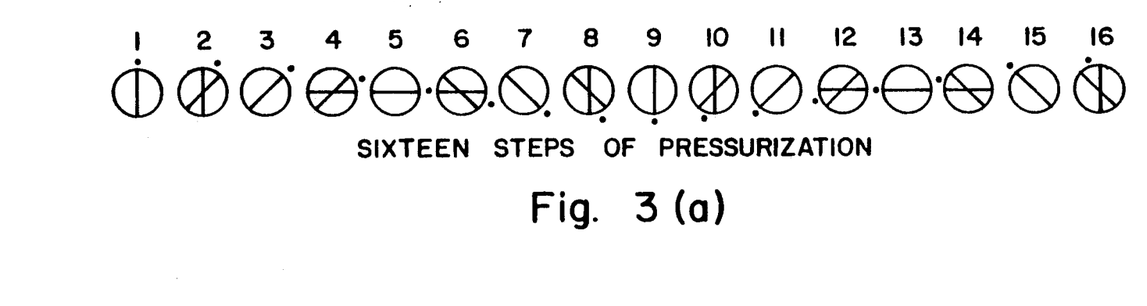
FIGS. 3a-3d illustrate the mode of operation of a pneumatic stepper motor.
Figure 3B:
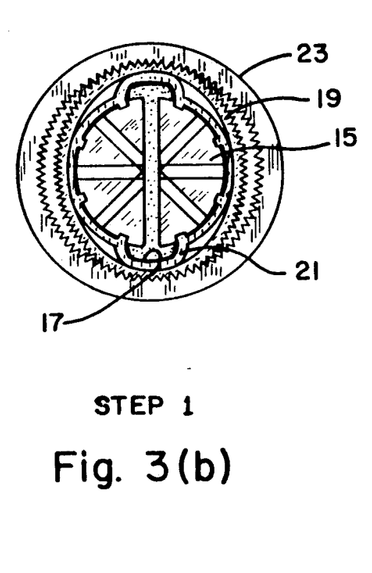
Figure 3C:
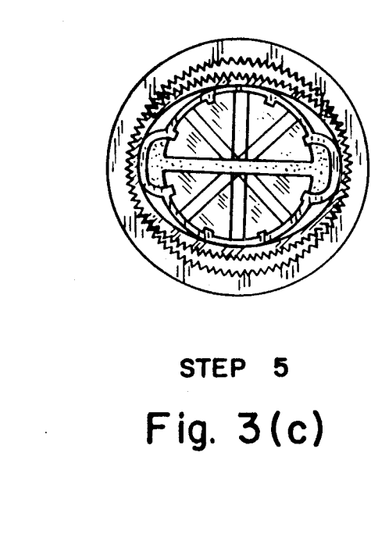
Figure 3D:
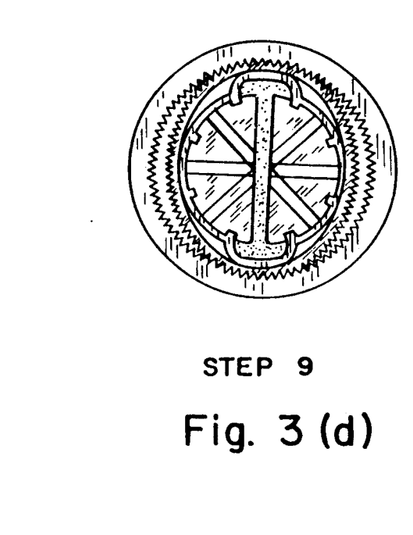
Figure 4A:
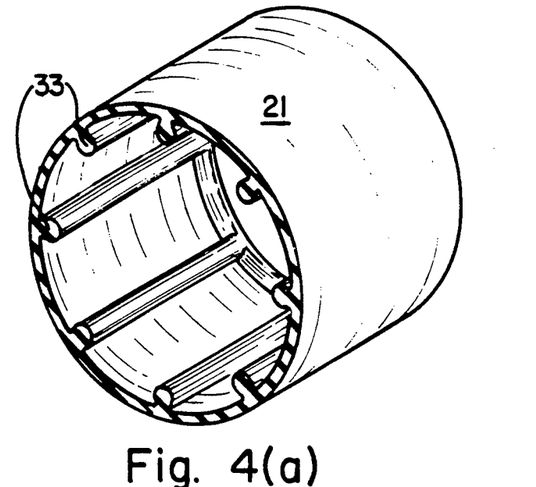
FIGS. 4a-4c are respectively a perspective view, an end plane view and a cross-sectional view of the membrane of FIG. 2.
Figure 4B:
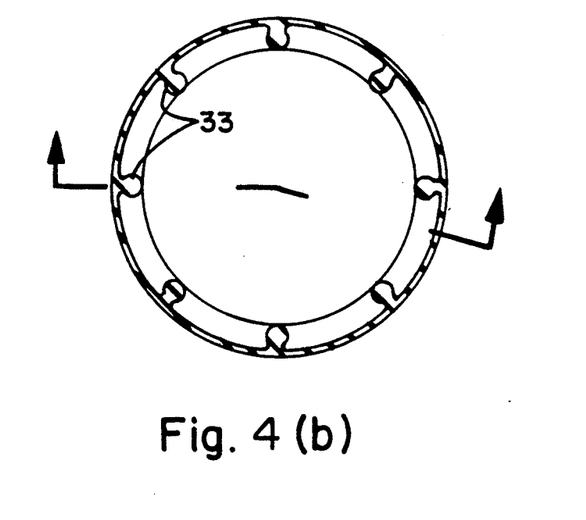
Figure 4C:
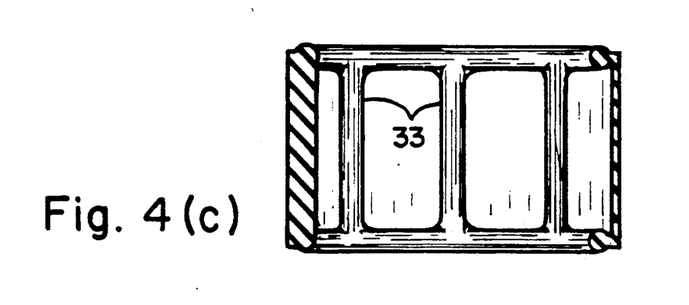

Shown in FIG. 2 is an AccuRay model 4505 linear stepper slice actuator, manufactured by ABB Process Automation of Columbus, Ohio, which utilizes a pneumatic stepper motor, generally 7, driving through a harmonic gear reduction, generally 9, to a keyed power screw 11 which outputs to the slice rod 5. Air enters the actuator from a central air supply and is distributed to four individual solenoid valves 13 mounted on a stator 15. Through sequential operation of these valves, air flows into pressure diaphragms 17 located within an inner elastic flex gear 19. The diaphragms 17 form a circle around the stator 15 and are sealed by a one-piece, rubber membrane 21. Each solenoid valve 13 channels air to a pair of diaphragms 17 located opposite each other. Successive, overlapping pressurization of the diaphragm pairs produces a rotating elliptical deformation of the stationary elastic gear 19. This action results in a continuous meshing of teeth between the inner elastic gear 19 and an outer gear ring 23.

Since the elastic gear typically has 160 teeth while the outer gear typically has 162 teeth, one revolution of 16 successive, overlapping pressurizations causes a relative motion of two teeth between the gears. A very high level of precision is therefore achieved by using $(162 \div 2) \times 16 = 1,296$ steps to generate one rotation of the outer gear. Rotation of the outer gear is converted to linear motion through a power screw drive. Each rotation of the stepper motor typically produces 100 mils (2.5 mm) of linear slice rod travel. Each step, thus generates $0.100$ in. $\div 1296 = 0.08$ mils (2 microns) of slice lip movement.

Force output of pneumatic weight actuators using such harmonic gears is limited by the efficiency of the gear set which, in turn, is inversely related to friction created between the alloy steel flex gear and the iron rigid gear typically used in existing actuators.

As previously mentioned, an important dimension for harmonic weight actuators is overall diameter. The largest diameter driving element is the harmonic rigid gear. Since this gear size is determined by the torque rating of the drive train, a chief design problem is trying to minimize the diameter of the actuator housing were it is packaged around the outside diameter of the rigid gear.

In the present invention, polymeric materials are employed in the construction of the harmonic gear set. Preferably, the flex gear is formed of nylon and the rigid gear is formed of acetal. These materials offer a reduced co-efficient of friction between the gears as compared to the conventional gear materials. As harmonic gears require sliding contact between gear teeth, this lower co-efficient of friction results in a more efficient conversion of pneumatic energy into rotary motion. Further, the polymeric flex gear is more compliant than a similar metallic one and, therefore, offers less resistance to the pneumatic action of the pressurized membrane.

Two problems arise, however, when polymers are utilized as harmonic gear materials in high force, small diameter pneumatic actuators. The first problem is gear size. Typical applications require actuators capable of exerting 4,000 pounds of force. Existing polymeric gear sets adapted to produce such a force have an outside diameter of 3.4 inches. On new headboxes, however, actuators are commonly spaced only 3 inches apart.

Figure 7A:
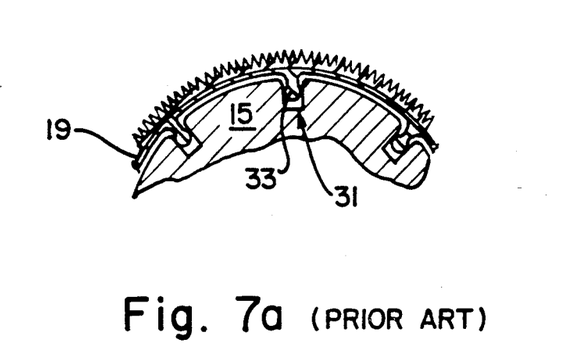
FIGS. 7a and 7b are enlarged fragmentary plan views of the prior art stator and membrane.
Figure 7B:
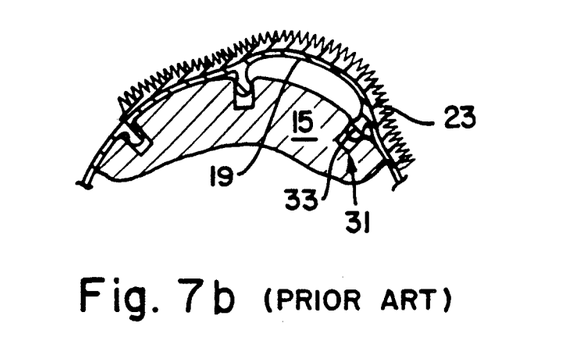
Figure 8:
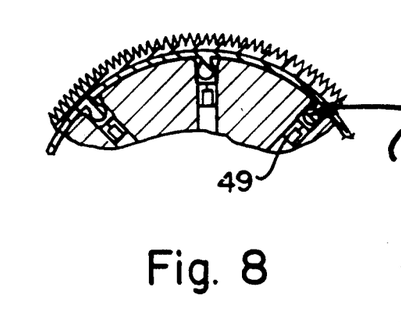

The second problem is air entrapment between the membrane and the stator. As illustrated in FIG. 7, as the membrane pressurizes and depressurizes, small amounts of air become trapped in the stator grooves 31, under the membrane 21. A polymeric flex gear, providing less spring force than a metal gear in returning the membrane to its depressurized shape, allows more air to remain trapped under the sealing ribs 33. Thus a polymeric gear, used in conjunction with a conventional stator, has less engagement movement of flex gear teeth between pressurized and depressurized states. The (effects are 1) less work done by each pressurization, as the gear force is exerted over a shorter distance; 2) increased rubbing between gears when manually actuated in a depressurized state (manual actuation is required in periods of lost air pressure or electric power); 3) creep in the flex gear diameter due to trapped air which creates a residual expansion force on the flex gear during periods of non-actuation, which is typically over 95% of actuator life; and 4) increased wear of the membrane as it is moved inside the stator grooves by the trapped air.

It is, therefore, a primary object of the present invention to provide a pneumatic stepper motor weight actuator which captures the advantages of polymeric harmonic gears while occupying less space and eliminating the problems associated with air entrapment in the stator grooves.

Elimination of trapped air is accomplished by creating orificed air passages from the bottom of the longitudinal stator grooves to the center stator hole (which contains the manual adjustment shaft). By testing various size orifices and various numbers of air passages it was found that a hole about 0.010 in. diameter could vent trapped air to an ambient pressure region in the center stator hole without orifice blockage by lubricants or membrane wear particles during actuator life, and without any increase in actuator air consumption.

Advantageously, the actuator includes a rigid gear comprising a toothed polymeric sleeve adhesively bonded inside a metal cup. The cup provides the desired hoop strength while permitting a substantial reduction in gear diameter. Specifically, such a composite gear, capable of producing the desired 4,000 pounds of force, has an outside diameter of less than 3 inches, while an equivalent conventional polymeric gear has a diameter of about 4 inches.

BRIEF DESCRIPTION OF THE DRAWINGS

FIGS. 8 and 8a are enlarged fragmentary plan views similar to FIGS. 7a and b, of stator and membrane arranged in accord with the present invention.

DETAILED DESCRIPTION OF THE PREFERRED EMBODIMENT

Figure 5:
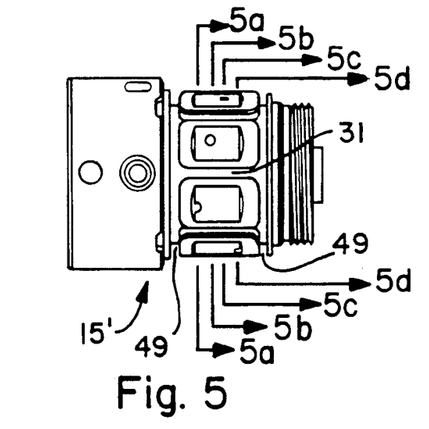
FIGS. 5, 5a-5d are respectively a side plan view and four cross-sectional views of a motor stator arranged in accord with the present invention.
Figure 5A:
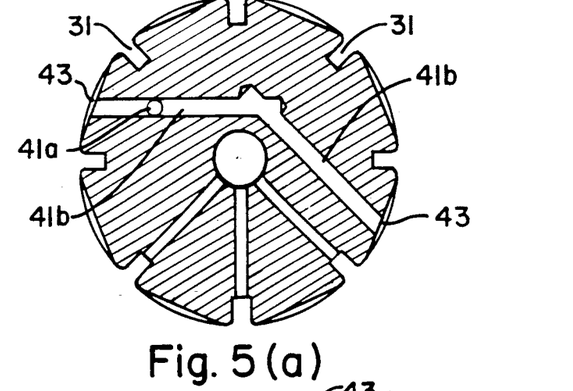
Figure 5B:
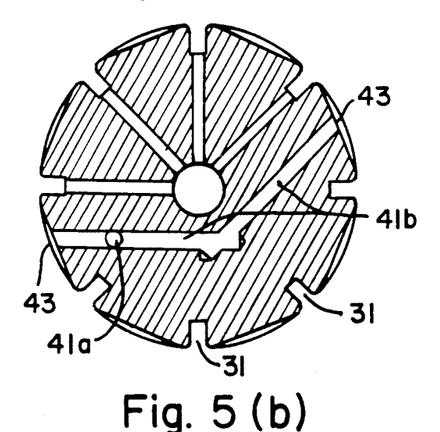
Figure 5C:
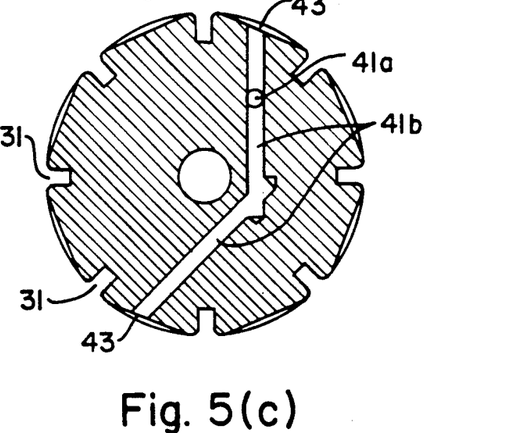
Figure 5D:
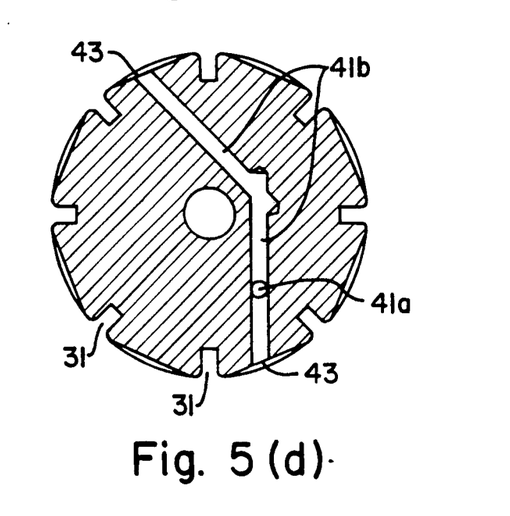
Figure 6:
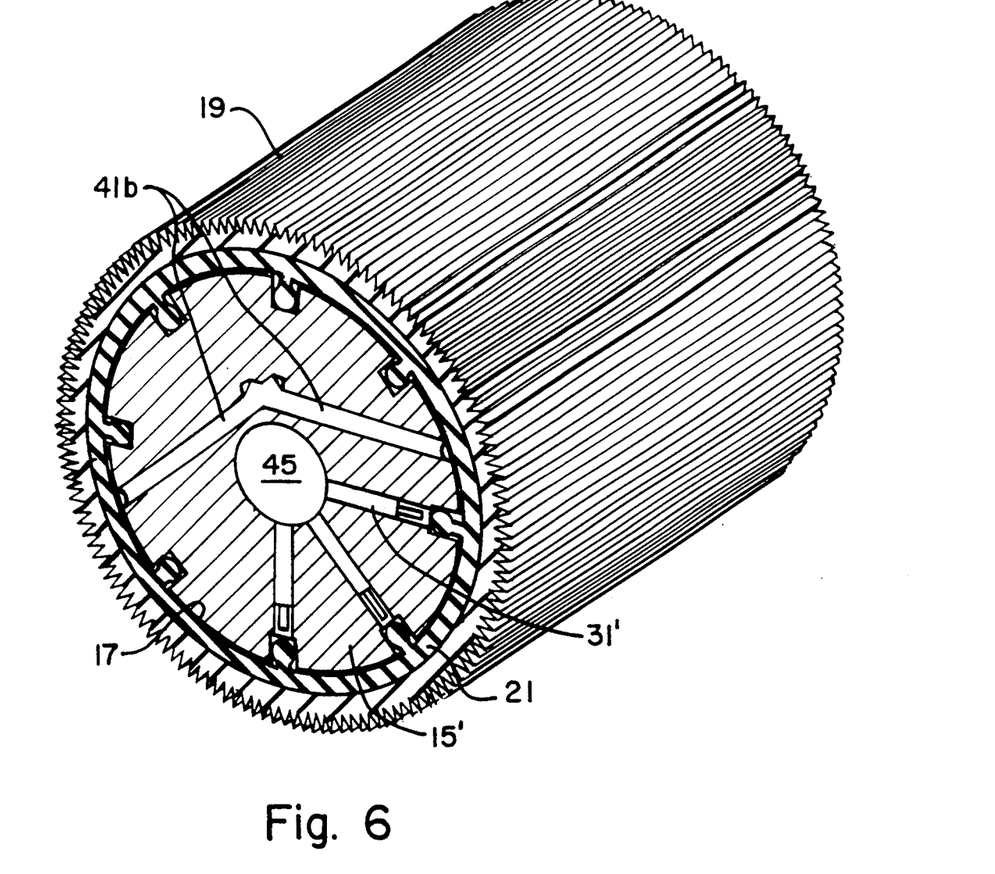
FIG. 6 is an enlarged perspective cross-sectional view of the stator of FIG. 5, together with a membrane and flex gear.

Referring to FIG. 5, there is illustrated a pneumatic stepper motor stator 15' including air conduits 41 for conveying compressed air to the chordal areas 43 beneath opposed ones of the diaphragms 17. Each of air conduits 41 includes a longitudinal riser portion 41a providing communication between one of solenoid valves 13 and a pair of planarly disposed transverse portions 41b opening into two opposed chordal areas 43. An axially extending center hole 45 loosely provides for a manual adjustment shaft 51. A number of radially directed passages 47 connect the bases of longitudinal grooves 31 with center hole 45 and provide for venting of air which would otherwise become entrapped between stator 15' and membrane 21.

As best seen in FIG. 5, longitudinal grooves 31 terminate in two annular grooves 50 and are, thus, in mutual flow connection such that, to an effective extent, venting of one longitudinal groove results in venting of the adjacent longitudinal grooves. Advantageously, passages 47 may, therefore, comprise two planarly disposed groups, of 3 and 4 respectively, thereby avoiding interference with air conduits 41 and facilitating manufacture. By testing various size orifices, it was determined that an orifice of about 0.010 inches diameter could vent the entrapped air to the ambient pressure region in the stator center hole without sufficient leakage to affect membrane pressurization, without orifice blockage by lubricants or membrane wear particles during normal actuator life, and without an increase in actuator air consumption. Radial bores, of about 0.095 inches diameter, are formed at the bases of the seven longitudinal grooves, disposed as above-described, and a plug 49, containing a 0.010 inch diameter orifice, is inserted in each.

Figure 9:
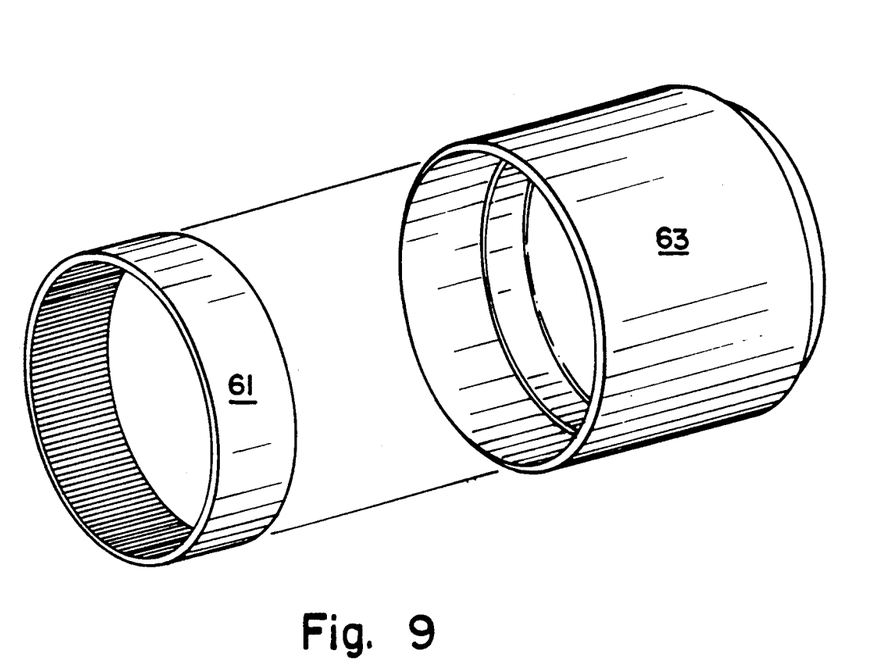
FIG. 9 is a perspective view of a rigid gear and cup arranged in accord with the present invention.

Turning now to FIG. 9, there is illustrated a pneumatic stepper motor rigid gear 23' comprising a tubular toothed acetal sleeve 61 adhesively fastened to the inner circumferential surface of a cup-shaped metal member 63. Advantageously, sleeve 61 may be fabricated by cutting or grinding a conventional acetal ring gear of the desired tooth dimensions.

Stator 15' and rigid gear 23' are employed in an actuator of the model illustrated in FIG. 2, together with a nylon flex gear, to achieve the advantages and benefits hereinabove described.

We claim:

1. In an actuator of the type comprising:

a housing;

a tooth stator rotationally fixed in said housing, said stator comprising a stator body, a flexible annular gear disposed about said stator body, and an extensible annular membrane disposed therebetween;

said stator body including a plurality of longitudinally extending grooves;

said membrane including a plurality of inwardly projecting longitudinal ribs adapted to be received in said longitudinal grooves of said stator body;

a toothed rotor rotatably carried in said housing, said rotor having a different number of teeth than said stator;

fluidic means for selectively bringing said teeth of said stator into driving engagement with said teeth of said rotor for rotating said rotor, said fluidic means including means for injecting pressurized fluid between selected portions of said membrane and said stator body;

a spindle slidably carried by said housing; and translation means for converting rotation of said rotor into linear displacement of said spindle;

the improvement comprising means for venting pressurized fluid which may become entrapped in said longitudinal grooves between said membrane ribs and said stator body.

2. The actuator of claim 1, wherein said venting means comprises means defining an axially extending center hole in said stator body and means defining fluid passages connecting a plurality of said longitudinal grooves with said center hole.

3. The actuator of claim 2, wherein said pressurized fluid is compressed air, said actuator further comprising flow constricting means in said fluid passages, said flow constricting means having an opening therethrough of approximately 0.010 inches in diameter.

4. The actuator of claim 1, wherein said rotor comprises a cup-shaped metallic member and a tubular tooth-bearing polymeric sleeve, said sleeve being adhesively fastened to an inner circumferential surface of said metallic member.

5. The actuator of claim 1, wherein said flexible annular gear is formed of a polymeric material.

6. The actuator of claim 5, wherein said flexible annular gear is formed of nylon.

7. The actuator of claim 4, wherein said tooth-bearing sleeve is formed of acetal.

* * * * *